US012585251B2

(12) United States Patent
Harnischfeger

(10) Patent No.: US 12,585,251 B2
(45) Date of Patent: Mar. 24, 2026

(54) METHOD FOR THE DISTRIBUTED CALCULATION OF COMPUTATIONAL TASKS

(71) Applicant: Schneider Electric Industries SAS, Rueil-Malmaison (FR)

(72) Inventor: Michael Harnischfeger, Moembris (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 390 days.

(21) Appl. No.: 18/065,970

(22) Filed: Dec. 14, 2022

(65) Prior Publication Data

US 2023/0195085 A1    Jun. 22, 2023

(30) Foreign Application Priority Data

Dec. 16, 2021    (EP) ..................................... 21306808

(51) Int. Cl.
G05B 19/418          (2006.01)

(52) U.S. Cl.
CPC . G05B 19/41835 (2013.01); G05B 19/41865 (2013.01); *G05B 2219/23289* (2013.01); *G05B 2219/25428* (2013.01)

(58) Field of Classification Search
CPC ........ G05B 19/41835; G05B 19/41865; G05B 2219/23289; G05B 2219/25428; G05B 19/0426; G05B 2219/23463; G05B 2219/25421; G05B 2219/33334; G05B 2219/39167; G05B 19/0421; G05B 2219/25229; G05B 2219/32328;
(Continued)

(56) References Cited

U.S. PATENT DOCUMENTS 6,009,455 A * 12/1999 Doyle .................. G06F 9/5072
                                                            709/201
6,112,225 A *  8/2000 Kraft .................... G06F 9/5072
                                                            709/227
(Continued)

FOREIGN PATENT DOCUMENTS

DE      11 2018 005 879 T5      8/2020
EP              2 924 561 A2      9/2015
(Continued)

OTHER PUBLICATIONS

Extended European Search Report issued Jun. 7, 2022 in European Patent Application No. 21306808.3 (with English Translation of Category of Cited Documents), 11 pages.
(Continued)

*Primary Examiner* — Christopher E. Everett
(74) *Attorney, Agent, or Firm* — Oblon, McClelland, Maier & Neustadt, L.L.P.

(57)                    ABSTRACT

The invention relates to a method for the distributed calculation of calculation tasks by means of field devices of an industrial plant, wherein a plurality of field devices are coupled to a task distribution unit by means of a data link, the field devices effect a control of the industrial plant in an operating state in each case, at least one of the field devices receives a calculation task from the task distribution unit in an idle state and changes to a calculation state in which the calculation task is processed.

16 Claims, 2 Drawing Sheets

Figure 1:
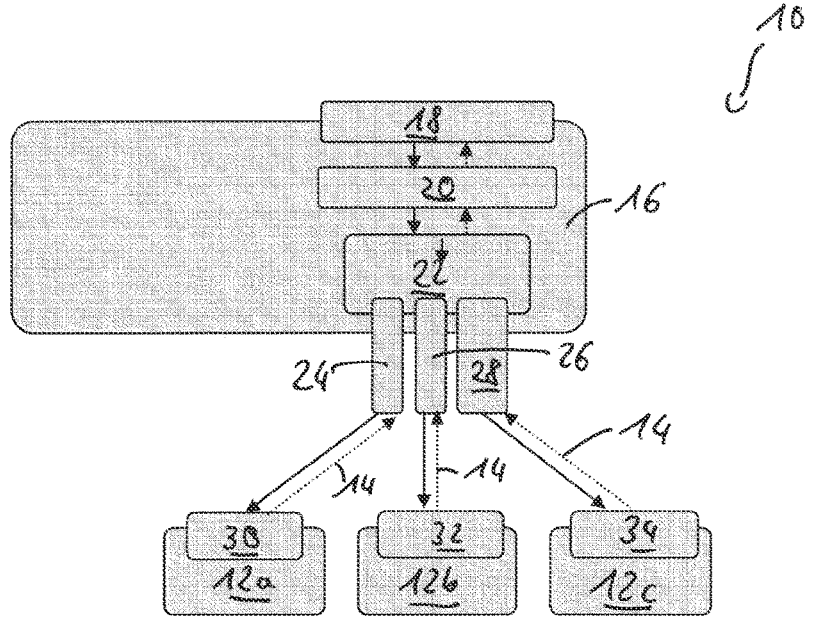

(58) Field of Classification Search
CPC ......... G05B 2219/33273; G06F 9/4881; G06F 9/5027; G06F 9/505
See application file for complete search history.

(56) References Cited

U.S. PATENT DOCUMENTS

| 6,249,836 | B1 * | 6/2001 | Downs | G06F 9/505 |
| | | | | 709/227 |
| 6,463,457 | B1 * | 10/2002 | Armentrout | G06F 9/5072 |
| | | | | 709/201 |
| 2015/0007185 | A1 * | 1/2015 | Dey | G06F 9/52 |
| | | | | 718/102 |
| 2015/0032886 | A1 | 1/2015 | Wang | |
| 2017/0154298 | A1 | 6/2017 | Maturana et al. | |
| 2018/0024537 | A1 | 1/2018 | Chauvet et al. | |
| 2018/0299873 | A1 | 10/2018 | Chauvet et al. | |
| 2018/0316729 | A1 | 11/2018 | Chauvet et al. | |
| 2019/0041824 | A1 | 2/2019 | Chavez et al. | |
| 2019/0041830 | A1 | 2/2019 | Yarvis et al. | |
| 2019/0042378 | A1 | 2/2019 | Wouhaybi et al. | |
| 2020/0310394 | A1 | 10/2020 | Wouhaybi et al. | |
| 2021/0012420 | A1 * | 1/2021 | Balakrishnan | G06Q 10/06316 |
| 2021/0243284 | A1 | 8/2021 | Wouhaybi et al. | |
| 2021/0356944 | A1 | 11/2021 | Chauvet et al. | |

FOREIGN PATENT DOCUMENTS

| WO | WO 2015/169352 A1 | 11/2015 |
| WO | WO 2015/171256 A1 | 11/2015 |
| WO | WO 2018/206502 A1 | 11/2018 |

OTHER PUBLICATIONS

Marshall, "Industry 4.0: The PLC evolves from Controller to Cloud Interface", Design Spark, Feb. 9, 2018, 7 pages.
Ismail, "Moving from central to the edge: Is cloud decentralization inevitable?", Information Age, Jun. 1, 2018, 5 pages.

* cited by examiner

METHOD FOR THE DISTRIBUTED CALCULATION OF COMPUTATIONAL TASKS

The present invention relates to a method for the distributed calculation of calculation tasks by means of field devices of an industrial plant.

In today's industrial plants, a large number of field devices, i.e. for example, programmable logic controllers that evaluate sensors of the industrial plant and control actuators. The field devices can in this respect be coupled to one another by means of data links to cooperate in order to effect the function of the industrial plant.

The tasks of the field devices are often limited in time, for example, a field device can perform a recurring task and can otherwise be inactive. The processing power of the field device is idle during the inactive time, which reduces the efficiency since significant power is often also consumed by the field device in the inactive state.

It is therefore the underlying object of the invention to specify a method that makes the operation of field devices in an industrial plant more efficient.

This object is satisfied by a method in accordance with claim 1.

In accordance with the method, calculation tasks are calculated in a distributed manner by means of field devices of an industrial plant, wherein a plurality of field devices are coupled to a task distribution unit by means of a data link, the field devices effect a control of the industrial plant in an operating state in each case, at least one of the field devices, preferably in an, at least partial or complete, idle state, receives a calculation task from the task distribution unit and changes to a calculation state in which the calculation task is processed.

The invention therefore starts from the state that the field devices are used in the operating state for the conventional control of the industrial plant. If, for example, an idling of a field device now occurs, the field device can receive a calculation task from the task distribution unit and can solve it, whereas the field device would typically have remained in the idle state. The available processing time of the field device is thus used for the processing of the calculation task and does not remain unused. However, the calculation task preferably has no influence on the control of the industrial plant and/or no connection to the industrial plant. The efficiency of the use of the electrical power that is anyway necessary for the operation of the field device can hereby be increased. The calculation task can in this respect be predefined externally and is forwarded to the field devices via the task distribution unit. Thus, in addition to its actual task, the industrial plant can additionally be used to provide processing power (similarly to a data center).

The main task of the field devices is the control of the industrial plant and not the processing of the calculation tasks. Accordingly, the field devices can, for example, be in the operating state more than 50% or more than 70% of the time, whereas the time in the calculation state occupies only 50% or 30% (for example, viewed over 24 hours).

The invention thus relates to a provision of processing power in a device network at the field bus level.

Via the data link with which the field devices are coupled to the task distribution unit, the task distribution unit can transmit the calculation tasks to the field devices.

The operating state is to be understood such that the field devices, for example, receive signals from sensors of the industrial plant and/or control actuators of the industrial plant and, for example, perform the calculations necessary for controlling the actuators. In short, in the operating state, a conventional operation of the industrial plant is performed by a respective field device. In this respect, the processing capacity of the field device can be predominantly or completely used for the operation of the industrial plant.

The idle state can indicate that a utilization (for example, a utilization of a processor of the respective field device) has fallen below a predetermined value, for example, 20% or 10%. Thus, 80% or 90% of the processor power can, for example, be available for the calculation task in the idle state.

The idle state can only signal that the field device is now available for the calculation task. The idle state does not really have to exist for a long time; instead, the calculation task can be processed directly after the end of the operating state. The calculation task does not necessarily have to be received in idle state, but can also be received at another point in time.

If the field device, for example, has a plurality of processor cores, only one currently free processor core, which is not required for the control of the industrial plant, can also perform the calculation task. Alternatively or additionally, free processing power, i.e. processing power that is not required for the control of the industrial plant, can also be used for the calculation task.

The task distribution unit can be a separate device, for example likewise a field device, but also a common PC (personal computer). The task distribution unit can in particular be implemented on a field device that also serves to control the industrial plant. The same applies to the secondary task distribution unit (mentioned below).

When it is mentioned in the following that at least one of the field devices fulfills a certain function and/or has a certain feature, it is thereby always also meant that a plurality of or all of the field devices have this function or this feature.

Advantageous further developments of the method in accordance with the invention are set forth in the description, in the drawings, and in the dependent claims.

In accordance with a first embodiment, the field devices report a current idle state to the task distribution unit and/or the task distribution unit polls the field devices for a current idle state. By reporting and/or polling the idle state, the task distribution unit can recognize which field devices are currently ready to process calculation tasks. The task distribution unit preferably dynamically distributes calculation tasks to field devices that are currently in the idle state. This means that the task distribution unit reacts to the current situation and, for example, assigns the next due calculation task to the next field device that enters the idle state. The polling of the idle state can in particular take place repeatedly. In industrial plants, the number of idle field devices can change rapidly so that the task distribution unit has to react dynamically to the respective situation, for example, in dependence on the currently available number and/or processing capacity of the field devices for the calculation tasks.

In accordance with a further embodiment, the task distribution unit distributes the calculation tasks to the field devices in dependence on the bandwidth and/or processing capacity provided by the respective field devices and/or on the provisional duration of the idle state. In addition to the idle state, the field devices can also report their processing capacity or the processing capacity free for calculation tasks to the task distribution unit. In addition, the transmission bandwidth and/or the provisional duration of time that the field device would remain in the idle state can, for example, be reported to the task distribution unit. The reporting can in particular take place after a preceding polling of the task distribution unit in each case.

The task distribution unit can in particular also distribute the pending calculation tasks based on the reported free processing capacity and/or transmission bandwidth and/or the provisional duration of the idle state so that the calculation tasks are then assigned as appropriately as possible, for example, less computationally intensive tasks to field devices with a low processing capacity and/or only a short duration of the idle state.

In accordance with a further embodiment, the task distribution unit provides an interface for receiving new calculation tasks. The task distribution unit in particular maintains or comprises a queue for new calculation tasks. The interface can in particular be an API (Application Programming Interface) via which calculation tasks can be transferred to the task distribution unit by means of a data link or software. The interface therefore in particular serves for receiving new calculation tasks and also for returning completed calculation tasks, i.e. their solution. The task distribution unit can in particular select from the queue those calculation tasks that are currently suitable for a field device (as already indicated above, in particular based on the time of the idle state, the processing capacity, and the transmission bandwidth). This means that the task distribution unit does not necessarily have to distribute the oldest calculation task to a field device, but can also assign another, less old calculation task to a field device.

In accordance with a further embodiment, the task distribution unit splits calculation tasks, which were in particular received via the interface, into a plurality of calculation tasks for different field devices. The task distribution unit can preferably subdivide large and computation-intensive calculation tasks in order, for example, to enable the solving of the calculation task during the time during which an individual field device is not in the operating state.

In accordance with a further embodiment, the task distribution unit distributes the calculation tasks as a container, in particular for virtualization, as a script, and/or as an interpreter code to the field devices. The calculation tasks can therefore be received from the field devices or transmitted to the field devices in various forms. For example, the calculation tasks can be transmitted as a container (e.g. Docker, LXC or the like). The containers can then be included and executed in a virtualization on the field device. For this purpose, at least one of the field devices can have a virtual machine (VM) for the calculation tasks. Alternatively or additionally, field devices having a script engine can be provided with scripts written in an appropriate script language. The field devices can then execute these scripts and can in this way process and/or solve the calculation task. Further alternatively or additionally, field devices can comprise an interpreter, for example an on-the-fly interpreter, to execute interpreter code received from the task distribution unit. The last-mentioned field devices can, for example, be Java-capable devices.

In accordance with a further embodiment, the calculation tasks carried out in the calculation state are performed with a lower priority on the field device than the control of the industrial plant in the operating state. This means that the control of the industrial plant in the operating state has priority in each case so that the control of the industrial plant is not disadvantageously affected by the execution of the calculation tasks. The control of the industrial plant can in particular take place completely independently of the execution of the calculation tasks in the field devices.

In accordance with a further embodiment, at least one of the field devices is real-time capable at least in the operating state. The field device can in particular execute a real-time capable operating system to control the industrial plant in the operating state.

Alternatively or additionally, at least one of the field devices is coupled to the task distribution unit by means of a real-time capable field bus. At least some or also all of the field devices of the industrial plant can be coupled to one another by means of the same or another real-time capable field bus. The aforementioned data link can accordingly be configured as a field bus, in particular a real-time capable field bus, for example as Sercos III, EIP, EtherCAT and the like.

The field devices can, for example, be programmable logic controllers (PLCs) that in particular do not have their own human-machine interfaces (e.g. keyboard or mouse) and also, for example, do not comprise their own screens. Accordingly, the field devices are not PCs or servers. The field devices can in particular also be limited in their memory equipment and their processing speed. For example, the field devices can have a maximum main memory (RAM) of 128 or 256 MB and a maximum clock frequency of 1 GHz.

In accordance with a further embodiment, the calculation task is a subtask of a larger task that was sent to the task distribution unit. As already indicated above, the task distribution unit can split larger tasks into a plurality of calculation tasks. In this respect, the calculation task is in particular part of a simulation, a prediction calculation (e.g. for predicting the weather), an application of artificial intelligence, a local analysis, or a self-optimization. Through the local analysis and/or the self-optimization, the calculation tasks can be used in order, for example, to make the operation of the industrial plant and/or of the field devices even more efficient.

In accordance with a further embodiment, at least one of the field devices changes from the calculation state to the operation state when an event or an interrupt occurs. Therefore, when an event and/or an interrupt occurs/occur that signals/signal to the field device that it is required for the control of the industrial process, the field device can thereby directly enter the control of the industrial process. Thus, a time offset is kept to a minimum on the transition to the operating state. The event or the interrupt can, for example, be the arrival of an external sensor signal at the field device or the expiration of a corresponding timer within the field device.

In accordance with a further embodiment, at least one of the field devices and/or the task distribution unit makes/ make a prediction as to when and/or how long the field device or a predetermined field device can be in the calculation state, whereupon the task distribution unit prepares a planning for calculation tasks to be distributed in the future based on the prediction. The prediction can be used to schedule resources available in the future. The prediction can, for example, be made based on recurring past sequences. The field device and/or the task distribution unit can, for example, recognize that a field device transitions to the idle state for one minute every five minutes. The task distribution unit can then use such information for the planning of future calculation tasks. It is also possible to determine the prediction based on a program sequence of the field device. For example, it can result from the programmed program sequence of the field device that the field device enters the idle state at predictable times.

In accordance with a further embodiment, at least 100 field devices, preferably at least 500 or 1000 field devices, are coupled to the task distribution unit. Accordingly, the industrial plant can comprise at least 100, 500, or 1000 field devices. The field devices can cooperate in the industrial plant to ensure the function of the industrial plant. The field devices can be of various designs and can, for example, differ in their performance, their speed, their memory space and the like. As already stated above, the task distribution unit can assign the respective suitable calculation tasks in a suitable format to the different field devices.

In accordance with a further embodiment, a plurality of the field devices cooperate in a machine of the industrial plant, wherein the machine comprises a secondary task distribution unit that distributes calculation tasks received from the task distribution unit to the field devices of the machine. The task distribution unit can thus be designed with two stages. The aforementioned (primary) task distribution unit and the secondary task distribution unit described herein can cooperate to distribute the calculation tasks to the field devices.

A plurality of different machines (for example, a robot or a processing machine) can be present in the industrial plant. The secondary task distribution unit in the respective machine can receive calculation tasks from the (primary) task distribution unit, wherein the secondary task distribution unit performs a sub-distribution to the field devices of the respective machine. The secondary task distribution unit can in this respect be configured in accordance with the (primary) task distribution unit and can work accordingly.

In accordance with a further embodiment, the calculation task is independent of the control of the industrial plant. This means that the calculation task is not required for the control of the industrial plant and the result of the calculation task is in particular not used for the control of the industrial plant. The calculation task can, in particular only, comprise calculations that serve other purposes than the control of the industrial plant, for example, the calculation task can comprise a simulation or the training of artificial intelligence. A single calculation task can also comprise only a part of an overall task in each case.

A further subject of the invention is an industrial plant, in particular a production line or a sorting plant, comprising a plurality of field devices and a task distribution unit. The field devices are coupled to the task distribution unit by means of a data link, wherein the field devices are configured to effect a control of the industrial plant in an operating state in each case;

at least one of the field devices is configured, in an at least partial or complete idle state, to receive a calculation task from the task distribution and to change to a calculation state in which the calculation task is processed.

The industrial plant can, for example, also be a photovoltaic system that has a large number of solar panels that can track the sun in a motorized manner, wherein the solar panels each comprise their own field device that provides the tracking of the sun. Such a photovoltaic system can, for example, comprise 5000 field devices that would each transition to the idle state, in particular at night but also between tracking operations. The processing power of the field devices that lies idle in this way can be sensibly used by the processing of the calculation tasks.

In another respect, the statements on the method in accordance with the invention apply accordingly to the industrial plant; this in particular applies with respect to advantages and embodiments.

The embodiments mentioned herein can all be combined with one another, unless explicitly stated otherwise.

Figure 2:
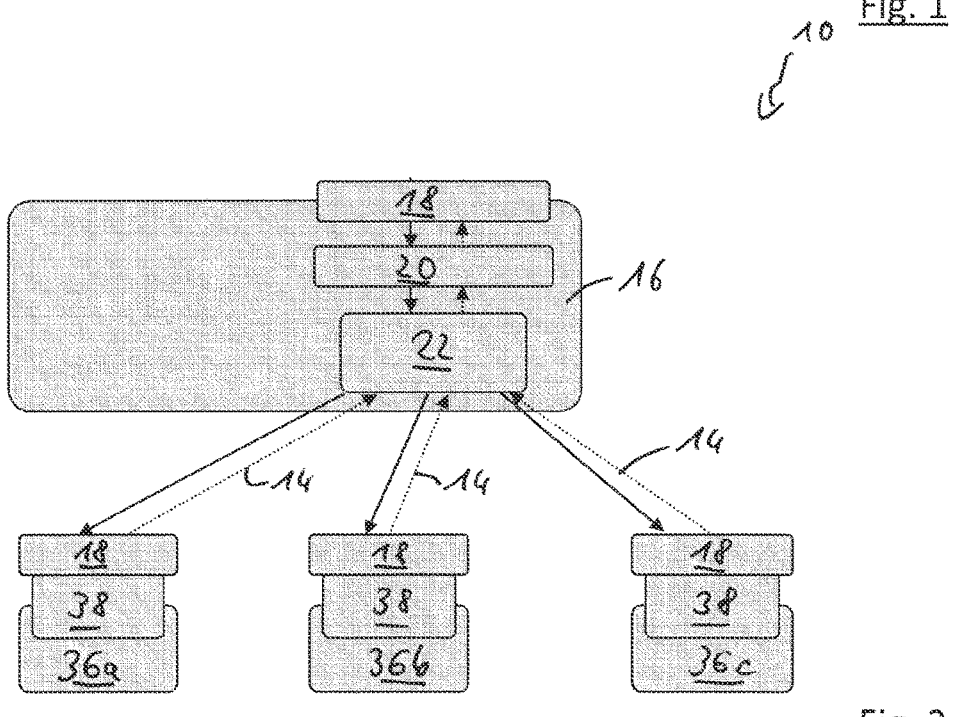
Figure 3:
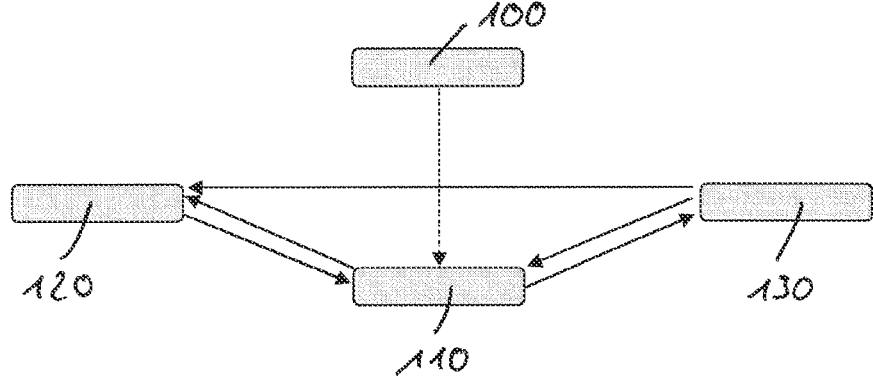

The invention will be described purely by way of example with reference to the drawings in the following. There are shown:

FIG. 1 schematically an industrial plant with a plurality of field devices and a task distribution unit;

FIG. 2 schematically an industrial plant with a plurality of machines and a primary and secondary task distribution unit; and FIG. 3 a state diagram of a field device with the different states which the field device can assume.

FIG. 1 schematically shows an industrial plant 10, for example, a manufacturing line for a product (not shown) that comprises a plurality of field devices 12a, 12b, 12c. The field devices are each coupled to a task distribution unit 16 by means of a field bus connection 14.

The task distribution unit 16 comprises an interface in the form of an API 18. Via the API 18, the task distribution unit 16 receives calculation tasks from an external source (not shown). The calculation tasks are converted into a form suitable for the field devices 12 in the task distribution unit 16 by means of a translation layer 20. A provisioning module 22 receives the calculation tasks from the translation layer 20 and "packages"/transforms the calculation tasks into a form that can be processed by the respective field device 12. In FIG. 1, a container 24 (for the virtualization), a script 26, and an interpreter code 28 are shown by way of example. The container 24 is transmitted to the field device 12a that has a container environment 30 for executing the container 24. The script 26 is transmitted to the field device 12b that has a script engine 32. Finally, the interpreter code 28 is transmitted to an interpreter 34 of the field device 12c.

After the processing of the calculation tasks, the field devices 12 transmit the processed calculation tasks via the field bus connections 14 to the task distribution unit 16 that outputs a result of the respective calculation task via the API 18.

FIG. 2 likewise shows an industrial plant 10 that, in contrast to FIG. 1, comprises a plurality of machines 36a, 36b, 36c. A plurality of field devices 12 are present in each machine 36 (not shown in FIG. 2). Each of the machines 36 has a secondary task distribution unit 38 that receives calculation tasks from the provisioning module 22 of the (primary) task distribution unit 16 via an API 18. The function within a machine 36 corresponds to the mode of operation that was already described with respect to FIG. 1.

FIG. 3 shows a state model of a field device 12. After a start 100, the field device 12 is initially in the idle state 110. To control the industrial plant 10, the field device 12 is set into an operating state 120. If the field device 12 is currently not necessary or not completely or not predominantly necessary for the control of the industrial plant, the field device 12 returns to the idle state 110. The fact that the field device 12 is in the idle state 110 is reported to the task distribution unit 16 that then assigns a calculation task to the field device 12. The field device 12 then changes to a calculation state 130 in which the calculation task is processed. After the processing of the calculation task, the field device 12 returns to the idle state 110 and can then, for example, be supplied with a further calculation task.

The operating state 120 has a higher priority than the calculation state 130. If the field device 12 now detects an event or an interrupt that indicate that the field device is required for the control of the industrial plant, the processing of the calculation task is immediately paused and the field device transitions from the calculation state 130 directly to the operation state 120 to effect the control of the industrial plant.

Once the control of the industrial plant has been completed again, a return can be made via the idle state 110 to the calculation state 130.

By providing for the calculation state 130, processing time that is typically not used can be sensibly used to increase the efficiency of the industrial plant with respect to the power consumption. The utilization of the field devices 12 can in this respect be dynamically reacted to by the task distribution unit 16.

REFERENCE NUMERAL LIST

10 industrial plant
12 field device
14 field bus connection
16 task distribution unit
18 API
20 translation layer
22 provisioning module
24 container
26 script
28 interpreter code
30 container environment
32 script engine
34 interpreter
36 machine
38 secondary task distribution unit
100 start
110 idle state
120 operating state
130 calculation state

The invention claimed is:

1. A method for distributed calculation of calculation tasks by a plurality of field devices of an industrial plant, wherein the field devices are coupled to a task distribution device by a data link, and the field devices effect control of the industrial plant in an operating state in each case, the method comprising:
   receiving, by a field device of the field devices, signals from a sensor of the industrial plant, and performing the control by controlling an actuator of the industrial plant by processing the received signals using part of a total computing power of the field device;
   receiving, by the field device, a calculation task, of the calculation tasks, from the task distribution device, wherein the calculation task has no influence on the control of the industrial plant and no connection to the industrial plant; and
   changing, by the field device, to a calculation state in which the calculation task is processed,
   wherein the field device performs the calculation task using free computing power, which is a portion of the total computing power of the field device performing the control that is not required by the field device to perform the control of the industrial plant, and
   wherein the method further comprises providing, by the task distribution device, an interface for receiving new calculation tasks for the field devices, and maintaining, by the task distribution device, a queue for the new calculation tasks.

2. The method in accordance with claim 1, further comprising reporting, by the field devices, a current idle state to the task distribution device and/or polling, by the task distribution device, the field devices for a current idle state, and
   dynamically distributing, by the task distribution device, the calculation tasks to those field devices currently in the idle state.

3. The method in accordance with claim 1, further comprising distributing, by the task distribution device, the calculation tasks to the field devices in dependence on a bandwidth and/or a processing capacity provided by the respective field devices and/or in dependence on a provisional duration of an idle state.

4. The method in accordance with claim 1, further comprising splitting, by the task distribution device, the calculation tasks into calculation tasks for different field devices and/or distributing the calculation tasks as a container.

5. The method in accordance with claim 4, further comprising splitting, by the task distribution device, the calculation tasks, which are received via the interface.

6. The method in accordance with claim 4, further comprising distributing, by the task distribution device, the calculation tasks as a container for virtualization, as a script, or as an interpreter code to the field devices.

7. The method in accordance with claim 1, further comprises performing the calculation tasks in the calculation state with a lower priority on the field device than the control of the industrial plant in the operating state.

8. The method in accordance with claim 1, wherein at least one of the field devices is real-time capable, at least in the operating state, and/or at least one of the field devices is coupled to the task distribution device by a real-time capable field bus.

9. The method in accordance with claim 1, wherein the calculation task is a subtask of a larger task that was sent to the task distribution device, and/or wherein the calculation task is part of a simulation, a prediction calculation, an application of artificial intelligence, a local analysis, or a self-optimization.

10. The method in accordance with claim 1, wherein at least one of the field devices changes from the calculation state to the operating state when an event or an interrupt occurs.

11. The method in accordance with claim 1, further comprising making, by the field device and/or the task distribution device, a prediction as to when and/or how long the field device can be in the calculation state, whereupon the task distribution device plans for calculation tasks to be distributed in the future based on the prediction.

12. The method in accordance with claim 1, wherein at least 100 field devices are coupled to the task distribution device.

13. The method in accordance with claim 1, wherein a subset of the field devices cooperate in a machine of the industrial plant, wherein the machine comprises a secondary task distribution device that distributes the calculation tasks, which are received from the task distribution device, to the field devices of the machine.

14. The method in accordance with claim 1, wherein the calculation task is independent of the control of the industrial plant.

15. The method in accordance with claim 1, wherein the receiving step comprises receiving the calculation task by the field device while in an idle state.

16. An industrial plant, comprising:
   a plurality of field devices; and
   a task distribution device, wherein the field devices are coupled to the task distribution device by a data link, the field devices are configured to effect control of the industrial plant in an operating state in each case, a field device, of the field devices, receives signals from a sensor of the industrial plant, and performs the control by controlling an actuator of the industrial plant by processing the received signals using part of a total computing power of the field device;

the field device is configured to receive a calculation task from the task distribution device when the field device is in an idle state and to change to a calculation state in which the calculation task is processed, wherein the calculation task has no influence on the control of the industrial plant and no connection to the industrial plant, the field device performs the calculation task using free computing power, which is a portion of the total computing power of the field device performing the control that is not required by the field device to perform the control of the industrial plant, and the task distribution device is configured to provide an interface for receiving new calculation tasks for the field devices, and maintain a queue for the new calculation tasks.

\* \* \* \* \*